United States Patent
Dudar

(10) Patent No.: US 10,323,618 B1
(45) Date of Patent: Jun. 18, 2019

(54) SYSTEMS AND METHODS FOR ENGINE KNOCK SENSOR RATIONALITY CHECK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/863,141

(22) Filed: Jan. 5, 2018

(51) Int. Cl.
  *F02D 41/22* (2006.01)
  *F02P 5/152* (2006.01)
  *F02D 35/02* (2006.01)

(52) U.S. Cl.
  CPC .......... *F02P 5/1526* (2013.01); *F02D 35/027* (2013.01); *F02D 41/222* (2013.01)

(58) Field of Classification Search
  CPC .... F02P 5/1526; F02D 35/027; F02D 41/222; G01L 23/22; G01L 23/221
  USPC ............ 123/406.16, 406.21, 406.29, 406.37, 123/406.38, 435; 701/107, 111; 73/35.07, 35.09, 114.07, 114.09
  See application file for complete search history.

(56) References Cited

U.S. PATENT DOCUMENTS

| | | | |
|---|---|---|---|
| 4,468,950 A * | 9/1984 | Ishigami | F02B 77/085 73/35.09 |
| 4,517,945 A * | 5/1985 | Ishigami | G01L 23/221 123/193.2 |
| 5,099,681 A * | 3/1992 | Dils | F02D 35/022 73/35.07 |
| 5,809,437 A | 9/1998 | Breed | |
| 6,012,426 A * | 1/2000 | Blommer | F02P 5/1525 123/406.37 |
| 6,354,264 B1 * | 3/2002 | Iwakiri | F02D 35/023 123/305 |
| 7,222,607 B2 | 5/2007 | Hernandez | |
| 7,502,718 B2 * | 3/2009 | Kanamaru | G07C 5/008 701/31.4 |
| 8,291,888 B2 * | 10/2012 | Itano | F02P 5/152 123/406.33 |
| 8,301,360 B2 | 10/2012 | Masuda et al. | |
| 2005/0005907 A1 * | 1/2005 | Torno | F02D 35/027 123/406.29 |
| 2016/0265455 A1 * | 9/2016 | Edington | F02D 41/26 |
| 2018/0023495 A1 * | 1/2018 | Dudar | F02D 37/02 701/102 |

OTHER PUBLICATIONS

Stewart, J., "Driverless Cars Need Ears as Well as Eyes," Wired Website, Available Online at https://www.wired.com/story/driverless-cars-need-ears-as-well-as-eyes/, Aug. 21, 2017, 7 pages.

* cited by examiner

*Primary Examiner* — Hai H Huynh
(74) *Attorney, Agent, or Firm* — Julia Voutyras; McCoy Russell LLP

(57) ABSTRACT

Methods and systems are provided for rationalizing an engine knock sensor. In one example, a method may include, responsive to an indication of an engine knock event, correlating an output of the engine knock sensor with an output of an on-board microphone to determine degradation of the engine knock sensor. By rationalizing the engine knock sensor against another on-board sensor (e.g., the on-board microphone), diagnostic fidelity may be increased.

20 Claims, 5 Drawing Sheets

SYSTEMS AND METHODS FOR ENGINE KNOCK SENSOR RATIONALITY CHECK

FIELD

The present description relates generally to methods and systems for determining knock sensor degradation.

BACKGROUND/SUMMARY

Engine knock is caused by spontaneous combustion of an air/fuel mixture in an engine cylinder (e.g., combustion chamber) outside of a combustion front from an ignition event (e.g., from a spark plug). As an example, carbon buildup within the cylinder may increase a compression ratio of the cylinder, resulting in an increased propensity for knock. A knock sensor may be utilized to identify knock so that an engine controller may employ various strategies to mitigate knock, such as by adjusting (e.g., retarding) a spark timing. The knock sensor may be a passive piezoelectric device that outputs a voltage in response to a received acoustic vibration, for example. A high amplitude knock sensor output in a knock frequency band may indicate a knock event. However, since strategies to reduce engine knock may degrade engine performance, decrease fuel economy, and increase emissions, a rationality check of the knock sensor may be used to ensure that knock reduction strategies are not employed in the absence of a knock event, such as due to false knock detection by the knock sensor.

Other attempts to address a knock sensor rationality check include determining knock sensor degradation based on the sensor output during engine operation. One example approach is shown by Hernandez et al. in U.S. Pat. No. 7,222,607 B2. Therein, a knock energy of a knock sensor is computed, and a knock sensor fault is determined if the knock energy is lower than an experimentally determined threshold.

However, the inventors herein have recognized potential issues with such systems. As one example, rationalizing the knock sensor using only output from the knock sensor itself may have low diagnostic fidelity. For example, under certain conditions, the energy of the knock sensor output may be lower than a threshold even when the knock sensor is not degraded. As an example, during a vehicle idle stop or during an electric mode of operation of a hybrid electric vehicle (HEV), the knock sensor output may be at or near zero. Under these conditions, prior approaches may lead to a false diagnosis of knock sensor degradation. As another example, comparing the knock energy to the experimentally determined threshold may not distinguish a true knock event from a falsely detected knock event, as the degraded knock sensor may have a knock energy that is higher than the threshold even in the absence of knock.

In one example, the issues described above may be addressed by a method, comprising: responsive to an indication of a knock event from a knock sensor coupled to an engine propelling a vehicle, correlating output of the knock sensor with output of a microphone on-board the vehicle to determine degradation of the knock sensor. In this way, the knock sensor may be rationalized against another on-board sensor, increasing diagnostic fidelity.

As one example, correlating the output of the knock sensor with the output of the microphone includes generating a frequency response of each of the knock sensor output and the microphone output during the knock event. The knock sensor is determined to be rational in response to a dominant frequency of the knock sensor frequency response matching a dominant frequency of the microphone frequency response, and the knock sensor is determined to be degraded in response to the dominant frequency of the knock sensor frequency response not matching the dominant frequency of the microphone frequency response. As a result, a detected knock event may be confirmed using a second on-board sensor, thereby indicating that the detected knock event is a true knock event and the knock sensor is rational. If the detected knock event is not confirmed, it may be determined that the knock sensor is degraded and detecting knock even in the absence of a true knock event. In this way, knock reduction strategies, including spark retard, are not employed in the absence of a true knock event detected by a rational knock sensor, preventing degraded engine performance, decreased fuel economy, and increased emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
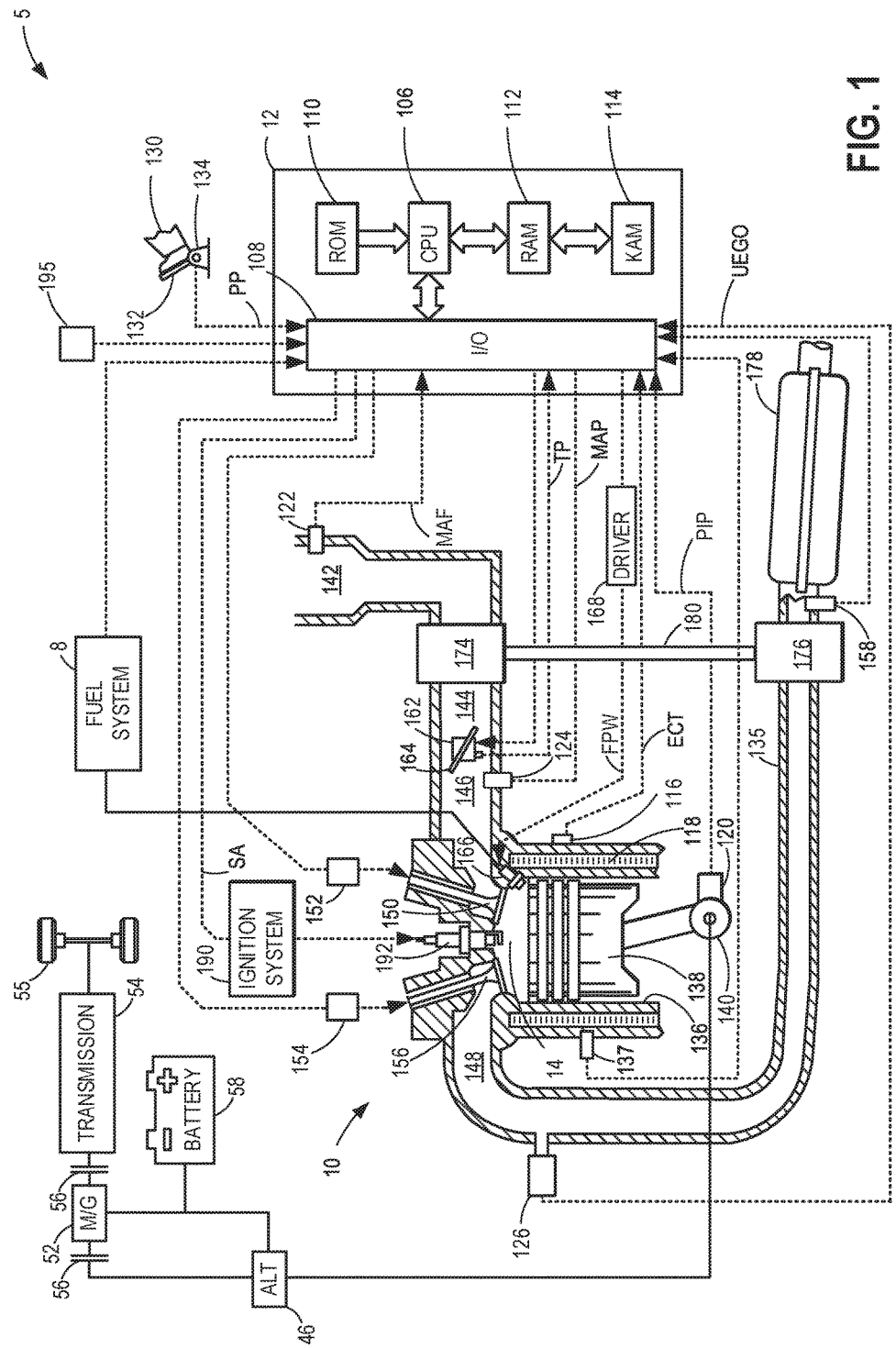
FIG. 1 shows a schematic depiction of an example vehicle system.

The following description relates to systems and methods for performing a rationality check of a knock sensor in an engine system, such as the engine system shown in FIG. 1. For example, knock sensor degradation may be determined by comparing a frequency response of the knock sensor with a time-matched frequency response of an on-board microphone, such as according to the example method of FIG. 2 and using the example signal processing algorithm illustrated in FIG. 3. Spark timing may be adjusted in response to knock detection when the knock sensor is determined to be rational (e.g., a detected knock event is a true knock event) but not when the knock sensor is determined to be degraded (e.g., the detected knock event is a false knock event), as illustrated in FIG. 4.

Turning to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Engine 10 may further include one or more knock sensors coupled to each cylinder 14 for identifying abnormal cylinder combustion events, such as knock sensor 137 shown in FIG. 1. In other examples, one or more knock sensors may be coupled to selected locations of the engine block. In some examples, knock sensor 137 may be an accelerometer coupled to the cylinder block. In another example, knock sensor 137 may be an ionization sensor configured in the spark plug of each cylinder. The output of knock sensor 137 may be used to indicate an abnormal combustion event in cylinder 14 and the rest of the cylinders included in engine 10. In one example, based on the output of knock sensor 137 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. In some examples, the knock sensor output may be combined with the output of a crankshaft acceleration sensor to identify one or more of knock and pre-ignition.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; a knock signal from knock sensor 137; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Furthermore, controller 12 may receive signals from an on-board microphone 195 coupled within vehicle 5. For example, on-board microphone 195 may be used to determine a sound level and/or frequency of various sounds in and around vehicle 5, including ambient sounds, voice commands, engine sounds, etc. In some examples, on-board microphone 195 may be located in a passenger cabin of vehicle 5, such as on a dashboard of the vehicle, and may be used for inputting voice commands from the vehicle operator, hands-free telephone conversations, etc. In other examples, on-board microphone 195 may be located externally, such as mounted on an exterior surface of vehicle 5 (e.g., on a windshield or hood) and may be used for navigation and obstacle avoidance based on ambient sounds from the environment of vehicle 5. In still other examples, on-board microphone 195 may be mounted in an under-hood compartment of vehicle 5. In each example, on-board microphone 195 transmits an output signal corresponding to sound pressure fluctuations from the various sources (e.g., the vehicle operator, the engine, and the vehicle environment). Controller 12 may distinguish noises from the various sources based on the frequency of the output, as further described below.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller. For example, the controller may receive an indication of knock from knock sensor 137 and sound measurements from on-board microphone 195, transform and/or filter the received signals, and determine if knock sensor 137 is rational, such as according to the routine of FIG. 2. If knock sensor 137 is determined to be rational, the occurrence of knock may be confirmed as true knock, and controller 12 may adjust engine operation to mitigate further occurrences of knock, such as by adjusting a spark timing of spark plug 192, as further described below.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
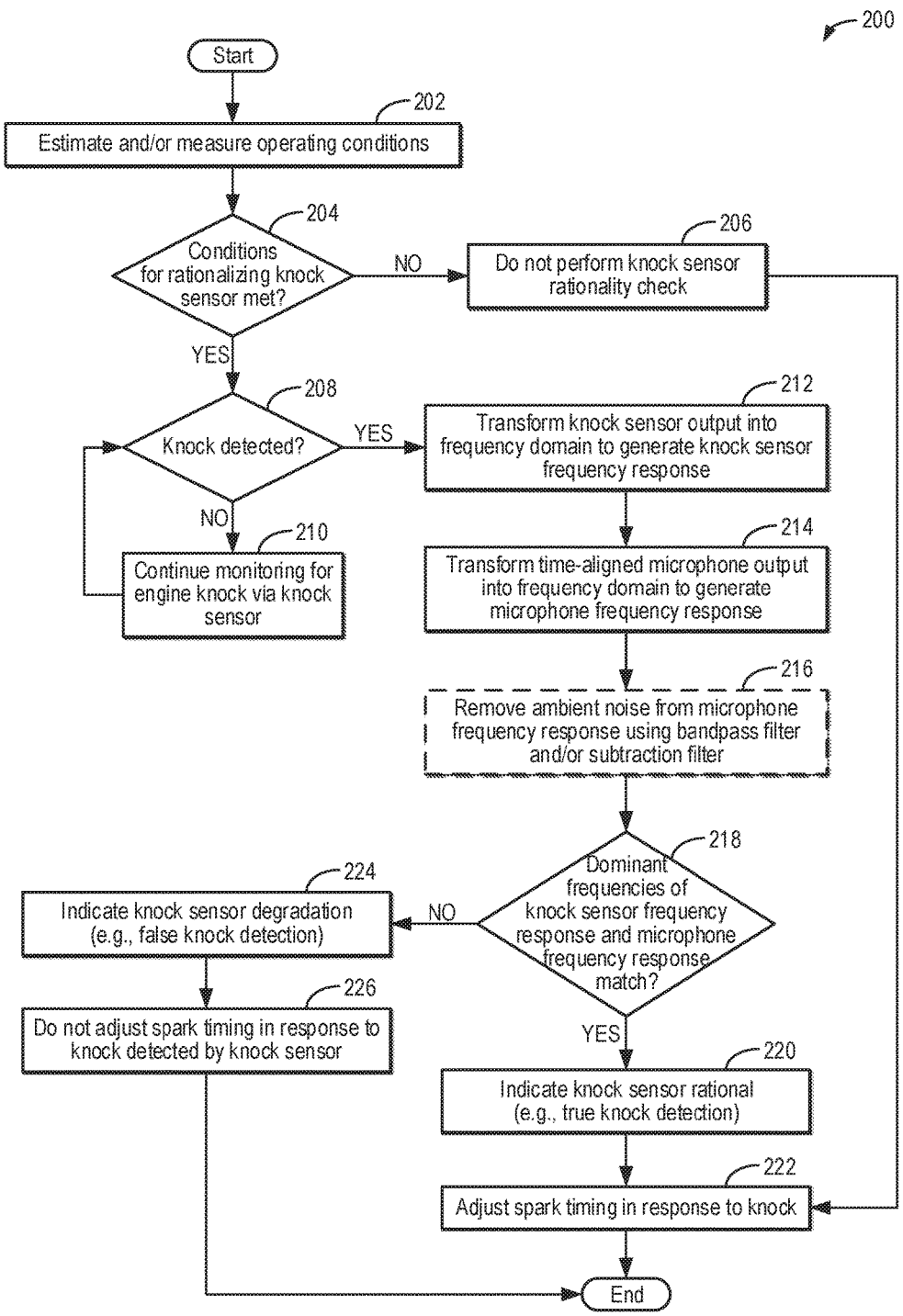
FIG. 2 shows an example method for performing an engine knock sensor rationality check using output from an on-board microphone.

Next, FIG. 2 shows an example method 200 for performing a knock sensor rationality check in an engine system, which may be included in a vehicle. For example, the method includes determining whether a knock event detected by the knock sensor has occurred (e.g., true knock detection) or not (e.g., false knock detection) by correlating an output of the knock sensor with an output of an on-board microphone. If the knock event detected by the knock sensor is confirmed by the on-board microphone, it may be determined that the knock sensor is rational, and engine operation may be adjusted to mitigate knock. If the knock event detected by the knock sensor is not confirmed by the on-board microphone, it may be determined that the knock sensor is degraded, and the engine operation may not be adjusted to mitigate knock. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., knock sensor 137 and on-board microphone 195 of FIG. 1). The controller may employ engine actuators of the engine system (e.g., spark plug 192 of FIG. 1) to adjust engine operation according to the methods described below.

Method 200 begins at 202 and includes estimating and/or measuring operating conditions. The operating conditions may include, but are not limited to, engine speed, engine load, driver torque demand (for example, as based on an output of a pedal position sensor coupled to an operator pedal), crankshaft angle, engine temperature, fuel octane of fuel available in a fuel tank, engine vibration level (e.g., as detected by the knock sensor), and spark timing. Engine speed and crankshaft angle may be determined based on a signal PIP output by a Hall effect sensor (e.g., Hall effect sensor 120 of FIG. 1), for example. Engine load may be determined based on a measurement of MAF from a MAF sensor (e.g., MAF sensor 122 of FIG. 1). The operating conditions may further include ambient conditions, such as ambient temperature, ambient pressure, and ambient noise. The ambient noise may refer to sound pressure fluctuations measured by the on-board microphone while the engine is off (e.g., at rest, without combustion occurring in engine cylinders). For example, the ambient noise may be measured by the on-board microphone prior to an engine start event or during an afterrun period (in which the both engine and the vehicle are off, with an ignition switch in an "off" position) and stored in a memory of the controller. Further, a geographic location in which the ambient noise is obtained may be stored, for example, as metadata. The geographic location may be determined using an onboard navigation system, such as a global positioning system, for example.

At 204, it is determined if conditions for rationalizing the knock sensor are met. As an example, the conditions for rationalizing the knock sensor may include a threshold duration having passed since the knock sensor was last rationalized. The threshold duration may be a predetermined time duration, such as days or weeks. As another example, the conditions for rationalizing the knock sensor may include the knock sensor rationality check not having been previously performed during the current drive cycle (e.g., since the most recent vehicle key-on event). As still another example, the conditions for rationalizing the knock sensor may include an indication that drivability issues, such as engine misfire and engine hesitation, have occurred. The conditions for rationalizing the knock sensor may further include an absence of an indication that the on-board microphone is degraded. In some examples, the conditions for rationalizing the knock sensor may additionally or alternatively include the vehicle operating in a low ambient noise environment, particularly if the use of frequency filters is not included in method 200, as will be described further below.

In other examples, when the use of frequency filters corresponding to ambient noise subtraction are included in method 200, the conditions for rationalizing the knock sensor may further include the vehicle being in substantially the same geographic location (e.g., within a threshold distance, such as 0.25 mile) as where the ambient noise was measured (e.g., as measured at 202).

If the conditions for rationalizing the knock sensor are not met, method 200 proceeds to 206 and includes not performing the knock sensor rationality check. For example, the knock sensor rationality check may not be performed when the conditions for rationalizing the knock sensor are not met in order to increase the fidelity of the outcome. Without performing the rationality check, the knock sensor cannot be determined to be degraded. Therefore, the knock sensor may be assumed to be rational, and spark timing may be adjusted in response to knock detection by the knock sensor, as will be described below at 222.

If the conditions for rationalizing the knock sensor are met, method 200 proceeds to 208 and includes determining if knock is detected. As described with respect to FIG. 1, knock may be detected based on an output of the knock sensor obtained during a defined knock window (e.g., cranking angle timing window, such as between approximately 4° from TDC to approximately 70° after TDC for an exemplary engine). For example, knock may be indicated in response to the output of the knock sensor surpassing a knock threshold within the knock window. The knock threshold may refer to a non-zero output amplitude below which the knock sensor output corresponds to engine vibrations due to nominal engine operation and above which the knock sensor output corresponds to engine vibrations due to knock.

If knock is not detected, method 200 proceeds to 210 and includes continuing to monitor for engine knock via the knock sensor. Without knock detected, the knock sensor cannot be rationalized using the on-board microphone. Therefore, the controller may continue to compare the output of the knock sensor with the knock threshold during engine operation so that a knock event may be identified. Method 200 may return to 208.

If knock is detected at 208, method 200 proceeds to 212 and includes transforming the knock sensor output into the frequency domain to generate a knock sensor frequency response. For example, the controller may perform a fast Fourier transform (FFT) of the knock sensor output collected during the detected knock event (e.g., during the knock window). The FFT identifies the frequency components of the engine vibrations measured by the knock sensor over the detected knock event by converting the knock sensor signal information to a magnitude and phase component of each frequency. In some examples, the FFT may be further converted to a power spectrum, in which a magnitude of each frequency component squared.

At 214, method 200 includes transforming a time-aligned output of the on-board microphone into the frequency domain to generate a microphone frequency response. The time-aligned output of the on-board microphone refers to the sound vibrations recorded by the microphone during the detected knock event (e.g., the same time period as the transformed knock sensor output, such as during the knock window). For example, the controller may perform a FFT of the microphone output collected over the detected knock event. The FFT identifies the frequency components of the sound vibrations measured by the on-board microphone over the detected knock event by converting the on-board microphone signal information to a magnitude and phase component of each frequency. Similar to the knock sensor frequency response, in some examples, the on-board microphone FFT may be further converted to a power spectrum. Although the sound vibrations may include sound from non-engine noise sources in addition to the engine (e.g., ambient noise from the environment and noise from a passenger cabin of the vehicle), generating the microphone frequency response may enable sound vibrations from the engine to be distinguished from those of the non-engine noise sources, as further described below, particularly if the conditions for rationalizing the knock sensor do not include the vehicle operating in a low ambient noise environment.

At 216, method 200 optionally includes removing ambient noise from the microphone frequency response using a bandpass filter and/or a subtraction filter. As one example, removing the ambient noise from the microphone frequency response may include passing the microphone frequency response through a bandpass filter having a predetermined bandwidth that enables frequencies within a known (e.g., predetermined) knock frequency range to pass while filtering out frequencies outside of the predetermined bandwidth, including those corresponding to non-engine noise sources (e.g., the ambient noise, including a frequency range that is audible to humans). As a non-limiting example, the bandpass filter may pass frequencies in a range from 4 kHz to 22 kHz (e.g., frequencies less than 4 kHz and greater than 22 kHz are filtered out). Additionally or alternatively, the controller may use a frequency subtraction filter to remove individual frequencies and/or a band of frequencies corresponding to the ambient noise. For example, the controller may determine the individual frequencies and/or the band of frequencies corresponding to the ambient noise from the measurements made by the on-board microphone during the vehicle afterrun. In this way, the knock sensor rationality check may be performed even in high ambient noise environments with high diagnostic accuracy.

At 218, it is determined if dominant frequencies of the knock sensor frequency response and the (optionally filtered) microphone frequency response match. For example, the controller may compare a dominant frequency of the knock sensor frequency response with a dominant frequency of the microphone frequency response to determine if the frequencies are the same. The dominant frequency of the knock sensor frequency response refers to the frequency having the highest magnitude in the knock sensor frequency response, and the dominant frequency of the microphone frequency response refers to the frequency having the highest amplitude in the microphone frequency response.

If the dominant frequencies match, method 200 proceeds to 220 and includes indicating that the knock sensor is rational. That is, the engine vibrations measured by the knock sensor match sound vibrations measured by the on-board microphone, indicating that the knock event detected by the knock sensor is true knock and not due to sensor degradation. Indicating that the knock sensor is rational (and not degraded) may include setting a flag at the controller to indicate that the rationality check was conducted and that the knock sensor passed. Further, indicating that the knock sensor is rational may further include indicating that the detected knock event is a true knock event, the detected knock event having been confirmed based on the output of the on-board microphone.

At 222, method 200 includes adjusting spark timing in response to knock. For example, the spark timing may be retarded from a first spark timing in response to the detection of knock at 208, with an amount of spark retard applied based on the first spark timing and further based on the indication of knock. For example, as an incidence of knock increases, the amount of spark retard applied may be increased. As another example, when the first spark timing is closer to maximum brake torque (MBT) timing, the amount of spark retard applied may be increased. The first spark timing may be a nominal spark timing, such as determined based on at least one of the engine speed, the engine load, and the fuel octane, or may be a previously adjusted spark timing (e.g., adjusted responsive to a previous indication of knock). In one example, the spark timing may be decreased by 1-2 crank angle degrees responsive to the indication of knock. With the detected knock indicated as a true knock event, the spark timing may remain retarded from the first spark timing. Furthermore, the spark timing may be adjusted in response to knock during subsequent knock events while the knock sensor is indicated to be rational (e.g., knock sensor degradation is not indicated). Following 222, method 200 ends.

If the dominant frequencies of the knock sensor frequency response and the microphone frequency response do not match at 218, method 200 proceeds to 224 and includes indicating knock sensor degradation. For example, method 200 proceeds to 224 in response to a dominant frequency mismatch at 218. That is, the engine vibrations measured by the knock sensor do not correlate with sound vibrations measured by the on-board microphone, indicating that the knock event detected by the knock sensor did not occur (e.g., is a false knock event) and may be an artifact of sensor degradation. Indicating knock sensor degradation may include setting a corresponding diagnostic trouble code (DTC) at the controller. Indicating knock sensor degradation and may further include illuminating a malfunction indicator lamp (MIL) on a dash of the vehicle to alert the vehicle operator to service the vehicle, for example.

At 226, method 200 includes not adjusting the spark timing in response to knock detected by the knock sensor. For example, with the knock sensor degraded (e.g., irrational), the knock sensor may indicate a knock event when knock is not present (e.g., a false knock event is detected). Furthermore, the controller may re-adjust the current spark timing. For example, because method 200 includes processing signals collected over time, the spark timing may be retarded from the first spark timing in response to the detection of knock at 208 prior to the indication that the knock sensor is degraded (e.g., at 224). Therefore, the spark timing may be advanced a corresponding number of degrees, such as returned to the first spark timing. Following 226, method 200 ends.

In some examples, prior to indicating knock sensor degradation at 224, method 200 may further include first rationalizing the microphone. For example, the microphone may be rationalized by altering spark timing and observing changes in the microphone and knock sensor responses. As one example, if the knock sensor indicates knock and the microphone does not (e.g., the dominant frequencies of the knock sensor frequency response and microphone frequency response do not match at 218), the spark timing may be advanced a predetermined amount that is expected to induce knock. If the microphone still does not detect knock in response to the advanced, knock-inducing spark timing, it may be assumed that the microphone is degraded and that the knock sensor is rational (e.g., method 200 proceeds to 220). As another example, spark timing may be retarded to prevent knock in response to the dominant frequency mismatch at 218. If the knock sensor still detects knock even after the spark timing is retarded, it may be confirmed that the knock sensor is degraded (e.g., method 200 proceeds to 224). As still another example, the controller may perform a series of spark timing adjustments, both advancing and retarding the spark timing within the series, in response to the dominant frequencies not matching at 218, analyze the frequency responses of the knock sensor and the microphone during each spark timing adjustment, and use logic rules to determine the rationality of the microphone and/or the knock sensor. In an alternative example, the microphone may be rationalized outside of method 200, such as by measuring sound produced by an onboard infotainment system.

In this way, the spark timing is adjusted in response to each of the output of the knock sensor (e.g., to detect the knock event at 208) and the output of the on-board microphone (e.g., to determine a condition of the knock sensor). For example, the spark timing may be initially retarded in response to a detection of knock by the knock sensor. If the knock sensor is determined to be in a rational condition, the retarded spark timing may be maintained. Furthermore, the spark timing may be retarded in response to subsequent detections of knock by the knock sensor. By retarding the spark timing in response to an indication of knock when the knock detector is in the rational condition, in-cylinder pressures may be decreased, thereby decreasing the propensity for further knock and resulting engine degradation. If the knock sensor is determined to be in a degraded condition, the retarded spark timing may be reverted to the previous timing. Furthermore, the spark timing may not be retarded in response to the subsequent detections of knock by the knock sensor. By not adjusting the spark timing when the degraded knock sensor detects knock, reduced engine performance, reduced fuel economy, and increased emissions resulting from retarding spark in the absence of knock may be avoided.

Thus, in one example, the method may include determining a rational condition of a knock sensor, and in response thereto, adjusting a spark timing responsive to a detection of knock by the knock sensor; and determining a degraded condition of the knock sensor (which may not be the rational condition), and in response thereto, not adjusting (e.g., maintaining) the spark timing responsive to the detection of knock by the knock sensor. In some examples, adjusting the spark timing responsive to the detection of knock by the knock sensor occurs while or during an indication of the rational condition, and maintaining spark timing responsive to the detection of knock by the knock sensor occurs while the indication of the rational condition is not present and/or while or during an indication of the degraded condition. Further, instructions stored in memory may include determining the rational condition from both of an output of the knock sensor and an output of an on-board microphone, and in response, adjusting the spark timing responsive to the detection of knock by the knock sensor by instructions for sending a signal to a spark plug; and determining the degraded condition from both of the output of the knock sensor and the output of the on-board microphone, and in response, not adjusting the spark timing responsive to the detection of knock by the knock sensor by instructions for sending a different signal to the spark plug. In some examples, the method may include determining whether to perform each of adjusting the spark timing responsive to the detection of knock by the knock sensor and not adjusting the spark timing responsive to the detection of knock by the knock sensor based on a determination of whether the rational condition is present and a determination of whether the degraded condition is present.

As illustrated by examples herein, the method of operating and performing actions responsive to a determination of the condition of the knock sensor may include operating with the knock sensor in the rational condition (e.g., operating with the vehicle traveling and the engine combusting), determining whether the rational condition is present (such as based on a correlation of the knock sensor output and the on-board microphone output) and performing actions in response thereto; as well as operating without the knock sensor in the rational condition (e.g., operating with the knock sensor in the degraded condition), determining that the rational condition is not present (e.g., the degraded condition is present), and performing a different action in response thereto. For example, responsive to a determination that the rational condition is present, engine operation may be adjusted to mitigate engine knock in response to a knock event detected by the knock sensor, and responsive to a determination that the rational condition is not present (e.g., the degraded condition is present), engine operation may not be adjusted to mitigate engine knock in response to a knock event detected by the knock sensor.

In some examples, the method may include differentiating between the rational knock sensor condition and the degraded knock sensor condition based on the output of the knock sensor and the output of the on-board microphone obtained during a most recent knock event and taking different actions in response to the differentiation. For example, when the differentiation indicates the rational knock sensor condition, the spark timing is retarded in response to a subsequent detection of knock by the knock sensor. Furthermore, a currently retarded spark timing, as retarded in response to the most recent knock event, is maintained. As another example, when the differentiation indicates the degraded knock sensor condition, the spark timing is not retarded in response to a subsequent detection of knock by the knock sensor. Furthermore, the currently retarded spark timing is reverted. As another example, the method may include adjusting the spark timing responsive to each of an output of the knock sensor and the output of the on-board microphone.

Figure 3:
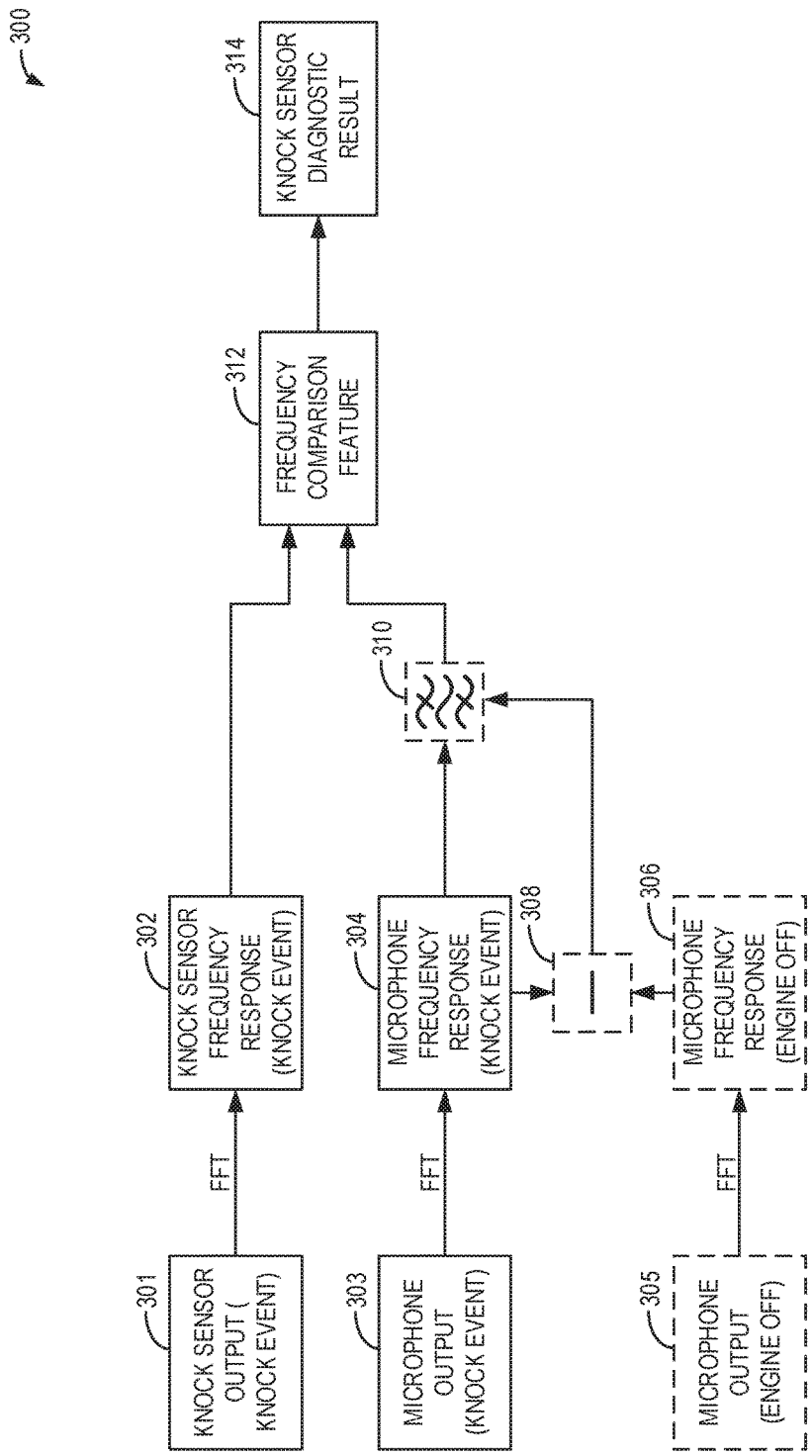
FIG. 3 schematically illustrates a block diagram of a signal processing algorithm for comparing a frequency response of a knock sensor with a frequency response of an on-board microphone to determine knock sensor degradation.

FIG. 3 schematically depicts a block diagram of a signal processing algorithm 300 for correlating an output of a knock sensor (e.g., knock sensor 137 of FIG. 1) with an output of an on-board microphone (e.g., on-board microphone 195 of FIG. 1) to rationalize the knock sensor. A controller (e.g., controller 12 of FIG. 2) may utilize signal processing algorithm 300 while performing method 200 of FIG. 2, for example. As diagrammed in FIG. 3, a knock sensor output 301 obtained during a knock event (e.g., as detected by the knock sensor) is converted into a knock sensor frequency response 302 via a FTT. The resulting knock sensor frequency response 302 is input into a frequency comparison feature 312. Similarly, a microphone output 303 obtained during the knock event is converted into a microphone frequency response 304 via a FTT. In some examples, as described above with respect to FIG. 2, microphone frequency response 304 may first undergo filtering to reduce an effect of non-engine related noise, such as ambient noise, on the knock sensor rationality check. For example, a microphone output 305 obtained while the engine is off, corresponding to ambient noise measurements, may be converted to a microphone frequency response 306 via a FTT. Microphone frequency response 306, corresponding to ambient noise frequencies measured while the engine was off, may optionally be subtracted from microphone frequency response 304 using a frequency subtraction filter 308. The resulting filtered microphone frequency response 304 may optionally pass through a bandpass filter 310 or be input directly into frequency comparison feature 312. Bandpass filter 310 may correspond to predetermined knock frequencies encountered by the knock sensor so that frequencies associated with knock are passed through bandpass filter 310 while other frequencies, including frequencies associated with ambient noise, are eliminated before microphone frequency response 304 is input into frequency comparison feature 312. As another example, microphone frequency response 304 may pass through bandpass filter 310 without having first passed through frequency subtraction filter 308. In other examples, microphone frequency response 304 may be directly input into frequency comparison feature 312 without having passed through either of frequency subtraction filter 308 or bandpass filter 310, particularly when the ambient noise is low.

Comparison feature 312 may include a set of instructions stored in memory for determining a dominant frequency of each of the knock sensor frequency response 302 and the (optionally filtered) microphone frequency response 304 as well as the hardware performing the set of instructions. Comparison feature 312 may directly compare the dominant frequency of the knock sensor frequency response 302 with the dominant frequency of the (optionally filtered) microphone frequency response 304 to determine if they match and output a corresponding knock sensor diagnostic result 314. For example, if the dominant frequency of the knock sensor frequency response 302 matches the dominant frequency of the microphone frequency response 304, the knock sensor diagnostic result 314 indicates that the knock sensor is rational, and the knock detected by the knock sensor is a true knock event. Conversely, if the dominant frequency of the knock sensor frequency response 302 does not match the dominant frequency of the microphone frequency response 304, the knock sensor diagnostic result 314 indicates that the knock sensor is degraded, and the knock detected by the knock sensor did not occur (e.g., is a false knock event). The controller may then adjust engine operation accordingly, such as by adjusting spark timing, as described above with respect to FIG. 3.

Figure 4A:
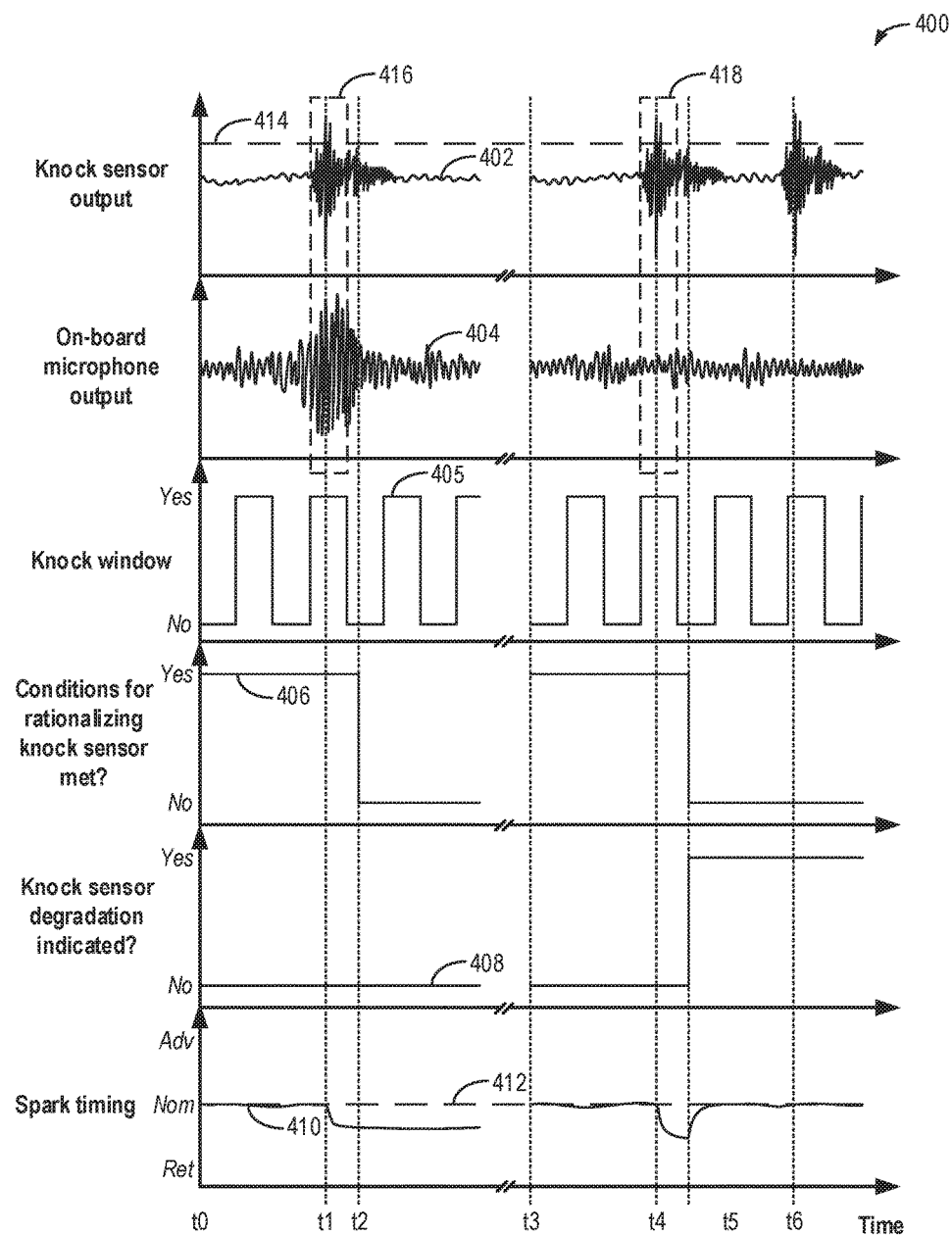
FIG. 4A illustrates a prophetic example timeline for performing an engine knock sensor rationality check.

Next, FIG. 4A depicts an example graph 400 of a timeline for correlating the output of a knock sensor (e.g., knock sensor 137 of FIG. 1) in a vehicle system with output from an on-board microphone (e.g., on-board microphone 195 of FIG. 1) to rationalize the knock sensor, such as according to the diagnostic method of FIG. 2. Knock sensor output is shown in plot 402, on-board microphone output is shown in plot 404, an indication of a knock window is shown in plot 405, an indication of whether conditions for rationalizing the knock sensor are met is shown in plot 406, an indication of whether the knock sensor is degraded is shown in plot 408, and spark timing is shown in plot 410. For all of the above, the horizontal axis represents time, with time increasing along the horizontal axis from left to right. The vertical axis represents each labeled parameter. For plots 402 and 404, the labeled parameter increases along the vertical axis from bottom to top. For plots 405, 406, and 408, the vertical axis represents whether the labeled parameter is indicated (e.g., "yes" or "no"). For plot 410, nominal spark timing ("nom") is represented by dashed line 412, and the vertical axis represents an amount of spark advance ("adv") or retard ("ret") from the nominal spark timing, with the amount of spark advance increasing up the vertical axis from dashed line 412 and the amount of spark retard increasing down the vertical axis from dashed line 412. Furthermore, a knock threshold is indicated by dashed line 414.

Beginning at time t0, the engine is operated with spark timing (plot 410) at or near the nominal spark timing (dashed line 412). Although the nominal spark timing is shown as a flat line, it should be understood that the nominal spark timing varies based on engine operating conditions, including engine speed and load. For example, the nominal spark timing may be at or near MBT timing, with a controller (e.g., controller 12 of FIG. 1) determining the current MBT timing by inputting the current engine operating conditions (e.g., engine speed and load) into a look-up table and outputting the corresponding MBT timing. The controller may send a signal SA to an ignition system (e.g., ignition system 190 of FIG. 1) to actuate each spark plug of the engine (e.g., spark plug 192 of FIG. 1) to initiate combustion at the determined timing. Furthermore, the knock window (plot 405) is shown as a step-wave form indicating a time period during which knock detection may occur for a combustion event.

As the engine is operated, the knock sensor measures engine vibrations and produces a corresponding output (plot 402), which is received by the controller. The measured engine vibrations due to nominal engine operation (e.g., abnormal combustion is not occurring) are small relative to vibrations produced by engine knock, with the knock sensor output (plot 402) remaining below the knock threshold (dashed line 414). The on-board microphone also measures sounds occurring during engine operation, including noise from nominal engine operation and ambient noise, and sends a corresponding output (plot 404) to the controller. Furthermore, between time t0 and time t1, conditions for rationalizing the knock sensor are met (plot 406). For example, a threshold duration may have passed since the knock sensor diagnostic was last performed, as described with respect to FIG. 2. Furthermore, knock sensor degradation is not indicated (plot 408).

At time t1, the knock sensor output (plot 402) surpasses the knock threshold within the knock window (plot 405), indicating a knock event has occurred. In response to the detected knock event, the spark timing (plot 410) is retarded from the nominal spark timing (dashed line 412), such as retarded from MBT timing. Since the conditions for rationalizing the knock sensor are met at time t1 (plot 406), the controller performs the knock sensor rationality check using the knock sensor output (plot 402) and the on-board microphone output (plot 404) obtained during the detected knock event (e.g., during the corresponding knock window). The knock sensor output and the on-board microphone output that is analyzed to perform the knock sensor rationality check is defined by dashed box 416, the knock sensor output and the on-board microphone output having the same time range. As described with respect to FIG. 2, the controller performs a FFT of each of the knock sensor output and the on-board microphone output sampled within dashed box 416.

Figures 4B, 4C:
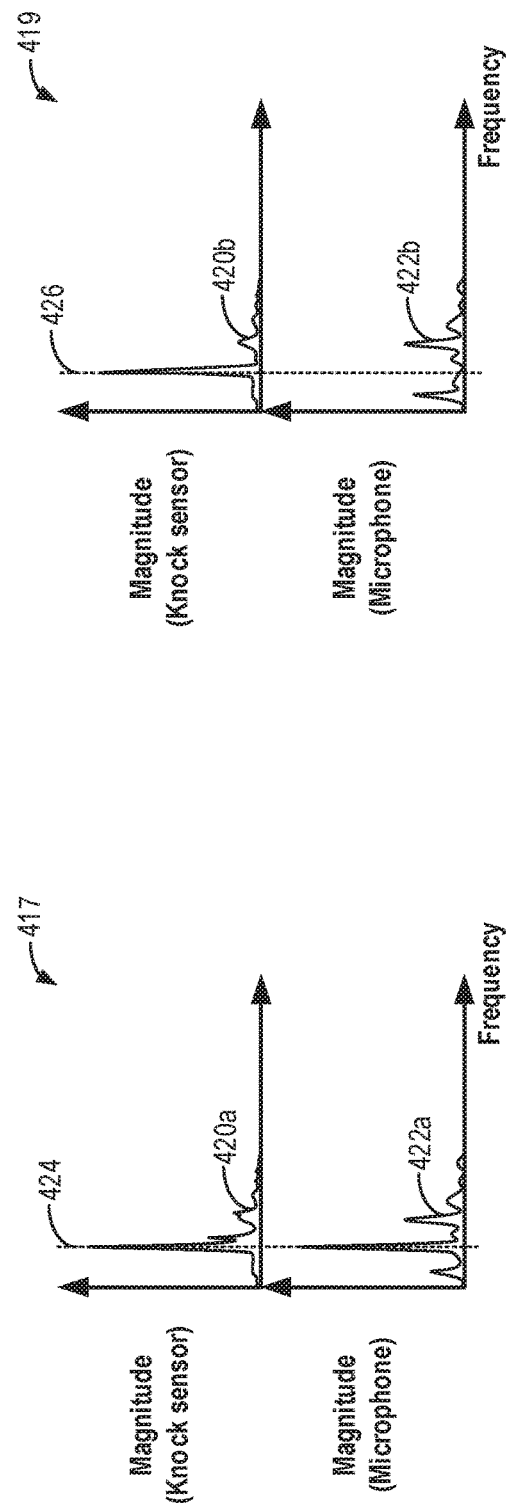
FIGS. 4B and 4C show frequency domain examples of selected signals from the timeline of FIG. 4A.

Turning to FIG. 4B, a graph 417 shows the resulting frequency response of each of the knock sensor output and the on-board microphone output sampled within dashed box 416. Specifically, a single-sided spectrum of the knock sensor FFT is shown in plot 420a, and a single-side spectrum of the on-board microphone FTT is shown in plot 422a. For the above, the horizontal axis represents the frequency, with the frequency increasing along the horizontal axis from left to right. The vertical axis represents the magnitude of each frequency response, with the magnitude increasing along the vertical axis from bottom to top. The dominant frequency of the knock sensor FTT (plot 420a) is at a frequency indicated by dashed line 424. The dominant frequency of the on-board microphone FFT (plot 422a) also occurs at the frequency of dashed line 424. Therefore, the dominant frequencies measured by the knock sensor and the on-board microphone during the detected knock event match.

Returning to FIG. 4A, at time t2, because the dominant frequencies match, the knock sensor is determined to be rational, and knock sensor degradation is not indicated (plot 408). Furthermore, since the detected knock event is confirmed as true knock, the spark timing (plot 410) remains retarded from the nominal spark timing (dashed line 412) to avoid a further occurrence of knock. With the knock sensor rationalization performed, conditions for rationalizing the knock sensor are no longer met (plot 406). Further, with no knock sensor degradation indicated, the controller may continue to retard the spark timing in response to further knock events detected by the knock sensor (e.g., when the knock sensor output exceeds the knock threshold within the knock window).

At a later time t3, the engine is again operated with spark timing (plot 410) at or near the nominal spark timing (dashed line 412), and the conditions for rationalizing the knock sensor are again met (plot 406). For example, time t3 may be days or weeks after time t2. With the engine on and operating (e.g., with combustion occurring within engine cylinders), the knock sensor measures engine vibrations and produces a corresponding output (plot 402), which is less than the knock threshold (dashed line 414) prior to time t4. The on-board microphone also measures sounds occurring during the engine operation and sends a corresponding output (plot 404) to the controller.

At time t4, the knock sensor output (plot 402) surpasses the knock threshold (dashed line 414) within the knock window (plot 405), indicating a knock event has occurred. In response to the knock event, the spark timing (plot 410) is retarded from the nominal spark timing (dashed line 412). Because the conditions for rationalizing the knock sensor are met at time t4 (plot 406), the controller again performs the knock sensor rationality check by performing a FTT of each of the knock sensor output (plot 402) and the on-board microphone output (plot 404) sampled during the detected knock event (e.g., as defined by dashed box 418).

Turning to FIG. 4C, a graph 419 shows the resulting frequency response of each of the knock sensor output and the on-board microphone output sampled within the time range defined by dashed box 418. A single-sided spectrum of the knock sensor FFT is shown in plot 420b, and a single-side spectrum of the on-board microphone FTT is shown in plot 422b. As in FIG. 4B, the horizontal axis represents the frequency, with the frequency increasing along the horizontal axis from left to right, and the vertical axis represents the magnitude of the labeled frequency response, with the magnitude increasing along the vertical axis from bottom to top. The dominant frequency of the knock sensor FTT (plot 420b) is at a frequency indicated by dashed line 426. The dominant frequency of the on-board microphone FFT (plot 422b) does not occur at the frequency of dashed line 426. Therefore, the dominant frequencies measured by the knock sensor and the on-board microphone during the detected knock event do not match.

Returning to FIG. 4A, at time t5, because the dominant frequencies do not match, the knock sensor is determined to be irrational, and knock sensor degradation is indicated (plot 408). Furthermore, because the detected knock event was not validated by the on-board microphone output (e.g., the detected knock event is a false knock event), the spark timing (plot 410) is returned to the nominal spark timing (dashed line 412) to avoid degraded engine performance and reduced fuel economy. With the knock sensor rationalization, conditions for rationalizing the knock sensor are no longer met (plot 406).

At time t6, the knock sensor output (plot 402) again surpasses the knock threshold (dashed line 414) within the knock window (plot 405). Because knock sensor degradation is indicated (plot 408), spark timing (plot 410) is not retarded in response to the detected knock event but remains at the nominal spark timing (dashed line 412). For example, with knock sensor degradation indicated (e.g., the knock sensor is determined to be in a degraded condition), the detected knock event at time t6 is assumed to be a false knock event. In this way, spark timing is not adjusted due to false knock detection by the degraded knock sensor. As a result, engine performance and fuel economy are increased.

In this way, by correlating output of a knock sensor with output of an on-board microphone, degradation of the knock sensor may be robustly identified so that engine control strategies for mitigating engine knock, such as spark retard, are not employed in the absence of true knock. For example, a detected knock event may be false when the knock sensor is degraded. By not retarding spark in response to false knock detection by the degraded knock sensor, engine performance degradation and reduced fuel economy is avoided. Furthermore, by correlating the output of the knock sensor with the output of the on-board microphone, true knock is confirmed, such as when the knock sensor is determined to be rational.

The technical effect of rationalizing a knock sensor using an on-board microphone is that a knock event may be identified as true knock or false knock, and spark timing may be retarded in response to true knock and not in response to false knock, thereby increasing engine performance and fuel economy.

As one example, a method comprises: responsive to an indication of a knock event from a knock sensor coupled to an engine propelling a vehicle, correlating output of the knock sensor with output of a microphone on-board the vehicle to determine degradation of the knock sensor. In the preceding example, additionally or optionally, the knock event is indicated in response to the output of the knock sensor being greater than a knock threshold within a predefined knock window. In any or all of the preceding examples, correlating the output of the knock sensor with the output of the microphone to determine degradation of the knock sensor additionally or optionally comprises: generating a frequency response of the knock sensor from output obtained over the knock event; generating a frequency response of the microphone from output obtained over the knock event; and determining if a dominant frequency of the knock sensor frequency response matches a dominant frequency of the microphone frequency response. In any or all of the preceding examples, the method additionally or optionally further comprises: prior to determining if the dominant frequency of the knock sensor frequency response matches the dominant frequency of the microphone frequency response, passing the microphone frequency response through one or more filters. In any or all of the preceding examples, additionally or optionally, the one or more filters include a frequency subtraction filter and a bandpass filter. In any or all of the preceding examples, additionally or optionally, the frequency subtraction filter removes frequencies corresponding to ambient noise from the microphone frequency response, the frequencies corresponding to the ambient noise determined based on output of the microphone obtained while the engine is off. In any or all of the preceding examples, additionally or optionally, the bandpass filter passes frequencies of the microphone frequency response corresponding to knock. In any or all of the preceding examples, the method additionally or optionally further comprises: indicating the knock sensor is rational in response to the dominant frequency of the knock sensor frequency response matching the dominant frequency of the microphone frequency response; and indicating degradation of the knock sensor in response to the dominant frequency of the knock sensor frequency response not matching the dominant frequency of the microphone frequency response. In any or all of the preceding examples, the method additionally or optionally further comprises: adjusting ignition spark timing of the engine in response to a subsequent indication of a knock event when the knock sensor is determined not to be degraded; and not performing the adjusting of the ignition spark timing when degradation of the knock sensor is indicated. In any or all of the preceding examples, additionally or optionally, correlating the output of the knock sensor with the output of the microphone to determine degradation of the knock sensor occurs during a low ambient noise condition. In any or all of the preceding examples, additionally or optionally, the low ambient noise condition is determined based on the output of the microphone while the engine is off.

As another example, a method comprises: adjusting a spark timing responsive to each of an output of a knock sensor coupled to the engine and an output of a microphone configured to measure sound produced by the engine. In the preceding example, the adjusting the spark timing responsive to each of the output of the knock sensor and the output of the microphone additionally or optionally further comprises: detecting a knock event responsive to the output of the knock sensor surpassing a knock threshold; and retarding the spark timing from a first spark timing in response to the detected knock event. In any or all of the preceding examples, the method additionally or optionally further comprises: determining frequency components of the knock sensor output sampled during the detected knock event via a fast Fourier transform; determining frequency components of the microphone output sampled during the detected knock event via the fast Fourier transform; maintaining the spark timing at the retarded spark timing in response to a dominant frequency of the determined frequency components of the knock sensor output matching a dominant frequency of the determined frequency components of the microphone output; and reverting the spark timing to the first spark timing in response to the dominant frequency of the determined frequency components of the knock sensor output not matching the dominant frequency of the determined frequency components of the microphone output. In any or all of the preceding examples, the method additionally or optionally further comprises: indicating degradation of the knock sensor in response to the dominant frequency of the determined frequency components of the knock sensor output not matching the dominant frequency of the determined frequency components of the microphone output; not adjusting the spark timing in response to a subsequently detected knock event. In any or all of the preceding examples, additionally or optionally, the adjusting the spark timing responsive to each of the output of the knock sensor and the output of the microphone occurs while the engine is operating in a low ambient noise environment, the low ambient noise environment determined based on the output of the microphone prior to starting of the engine.

As a further example, a vehicle system comprises: an engine including a plurality of cylinders, each cylinder including a spark plug coupled thereto; a knock sensor coupled to the engine; a microphone coupled in the vehicle; a controller holding instructions in non-transitory memory that, when executed, cause the controller to: determine a condition of the knock sensor based on an output of the knock sensor and an output of the microphone obtained during a detection of knock by the knock sensor; adjust a timing of a spark provided by the spark plug during a subsequent detection of knock by the knock sensor based on the determined condition. In the preceding example, additionally or optionally, the condition of the knock sensor is one of a rational condition and a degraded condition. In any or all of the preceding examples, additionally or optionally, determining the condition of the knock sensor based on the output of the knock sensor and the output of the microphone obtained during the detection of knock by the knock sensor comprises: transforming each of the output of the knock sensor and the output of the microphone obtained during the detection of knock into frequency domain; indicating the knock sensor is in the rational condition in response to a dominant frequency match between the transformed output of the knock sensor and the transformed output of the microphone; and indicating the knock sensor is in the degraded condition in response to a dominant frequency mismatch between the transformed output of the knock sensor and the transformed output of the microphone. In any or all of the preceding examples, additionally or optionally, adjusting the timing of the spark provided by the spark plug during a subsequent detection of knock by the knock sensor based on the determined condition includes retarding the spark timing in response to the subsequent detection of knock when the determined condition is the rational condition and not retarding the spark timing in response to the subsequent detection of knock when the determined condition is the degraded condition.

In another representation, a method comprises: determining whether a detected engine knock event is true or false based on an output of a knock sensor coupled to the engine and an output of a microphone configured to measure sound produced by the engine; retarding spark timing in response to the detected engine knock event being true; and not retarding spark timing in response the detected engine knock event being false. In the preceding example, additionally or optionally, the detected engine knock event is responsive to the output of the knock sensor surpassing a knock threshold. In any or all of the preceding examples, additionally or optionally, determining whether the detected engine knock event is true or false based on the output of the knock sensor and the output of the microphone comprises: in response to conditions for rationalizing the knock sensor being met, determining frequency components of the knock sensor output sampled during the detected engine knock event via a fast Fourier transform; determining frequency components of the microphone output sampled during the detected engine knock event via the fast Fourier transform; indicating the detected knock event is true in response to a dominant frequency of the determined frequency components of the knock sensor output matching a dominant frequency of the determined frequency components of the microphone output; and indicating the detected knock event is false in response to the dominant frequency of the determined frequency components of the knock sensor output not matching the dominant frequency of the determined frequency components of the microphone output. In any or all of the preceding examples, additionally or optionally, the conditions for rationalizing the knock sensor include at least one of the engine operating in a low ambient noise environment and a threshold duration since previously rationalizing the knock sensor having elapsed. In any or all of the preceding examples, additionally or optionally, the low ambient noise environment is determined based on sound measured by the microphone prior to starting of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
via a controller,
responsive to an indication of a knock event from a knock sensor coupled to an engine propelling a vehicle, correlating output of the knock sensor with output of a microphone on-board the vehicle to determine degradation of the knock sensor; and
providing an alert to a vehicle operator responsive to determining degradation of the knock sensor.

2. The method of claim 1, wherein the knock event is indicated in response to the output of the knock sensor being greater than a knock threshold within a pre-defined knock window.

3. The method of claim 1, wherein correlating the output of the knock sensor with the output of the microphone to determine degradation of the knock sensor comprises:
generating a frequency response of the knock sensor from output obtained over the knock event;
generating a frequency response of the microphone from output obtained over the knock event; and
determining if a dominant frequency of the knock sensor frequency response matches a dominant frequency of the microphone frequency response.

4. The method of claim 3, further comprising:
prior to determining if the dominant frequency of the knock sensor frequency response matches the dominant frequency of the microphone frequency response, passing the microphone frequency response through one or more filters.

5. The method of claim 4, wherein the one or more filters include a frequency subtraction filter and a bandpass filter.

6. The method of claim 5, wherein the frequency subtraction filter removes frequencies corresponding to ambient noise from the microphone frequency response, the frequencies corresponding to the ambient noise determined based on output of the microphone obtained while the engine is off.

7. The method of claim 5, wherein the bandpass filter passes frequencies of the microphone frequency response corresponding to knock.

8. The method of claim 3, further comprising:
indicating the knock sensor is rational in response to the dominant frequency of the knock sensor frequency response matching the dominant frequency of the microphone frequency response; and
indicating degradation of the knock sensor in response to the dominant frequency of the knock sensor frequency response not matching the dominant frequency of the microphone frequency response.

9. The method of claim 1, further comprising:
adjusting ignition spark timing of the engine in response to a subsequent indication of a knock event when the knock sensor is determined not to be degraded; and
not performing the adjusting of the ignition spark timing when degradation of the knock sensor is indicated.

10. The method of claim 1, wherein the correlating the output of the knock sensor with the output of the microphone to determine degradation of the knock sensor occurs during a low ambient noise condition.

11. The method of claim 10, wherein the low ambient noise condition is determined based on output of the microphone while the engine is off.

12. A method for a spark ignition engine, comprising:
via a controller,
adjusting a spark timing responsive to each of an output of a knock sensor coupled to the engine and an output of a microphone configured to measure sound produced by the engine, wherein the output of the microphone is used to determine a condition of the knock sensor.

13. The method of claim 12, wherein the adjusting the spark timing responsive to each of the output of the knock sensor and the output of the microphone comprises:
detecting a knock event responsive to the output of the knock sensor surpassing a knock threshold; and
retarding the spark timing from a first spark timing in response to the detected knock event.

14. The method of claim 13, further comprising:
determining frequency components of the knock sensor output sampled during the detected knock event via a fast Fourier transform;
determining frequency components of the microphone output sampled during the detected knock event via the fast Fourier transform;
maintaining the spark timing at the retarded spark timing in response to a dominant frequency of the determined frequency components of the knock sensor output matching a dominant frequency of the determined frequency components of the microphone output; and
reverting the spark timing to the first spark timing in response to the dominant frequency of the determined frequency components of the knock sensor output not matching the dominant frequency of the determined frequency components of the microphone output.

15. The method of claim 14, further comprising:
indicating the condition of the knock sensor to be degraded in response to the dominant frequency of the determined frequency components of the knock sensor output not matching the dominant frequency of the determined frequency components of the microphone output; and
not adjusting the spark timing in response to a subsequently detected knock event.

16. The method of claim 12, wherein the adjusting the spark timing responsive to each of the output of the knock sensor and the output of the microphone occurs while the engine is operating in a low ambient noise environment, the low ambient noise environment determined based on output of the microphone prior to starting of the engine.

17. A vehicle system, comprising:
an engine including a plurality of cylinders, each cylinder including a spark plug coupled thereto;
a knock sensor coupled to the engine;
a microphone coupled in the vehicle;
a controller holding instructions in non-transitory memory that, when executed, cause the controller to:
determine a condition of the knock sensor based on an output of the knock sensor and an output of the microphone obtained during a detection of knock by the knock sensor;
adjust a timing of a spark provided by the spark plug during a subsequent detection of knock by the knock sensor based on the determined condition.

18. The system of claim 17, wherein the condition of the knock sensor is one of a rational condition and a degraded condition.

19. The system of claim 18, wherein determining the condition of the knock sensor based on the output of the knock sensor and the output of the microphone obtained during the detection of knock by the knock sensor comprises:
transforming each of the output of the knock sensor and the output of the microphone obtained during the detection of knock into frequency domain;
indicating the knock sensor is in the rational condition in response to a dominant frequency match between the transformed output of the knock sensor and the transformed output of the microphone; and
indicating the knock sensor is in the degraded condition in response to a dominant frequency mismatch between the transformed output of the knock sensor and the transformed output of the microphone.

20. The system of claim 18, wherein adjusting the timing of the spark provided by the spark plug during a subsequent detection of knock by the knock sensor based on the determined condition includes retarding the spark timing in response to the subsequent detection of knock when the determined condition is the rational condition and not retarding the spark timing in response to the subsequent detection of knock when the determined condition is the degraded condition.

* * * * *